US012359466B2

(12) United States Patent
Cook et al.

(10) Patent No.: US 12,359,466 B2
(45) **Date of Patent: *Jul. 15, 2025**

(54) MOTORIZED LOCK METHOD AND ASSEMBLY

(71) Applicant: Alfred International Inc., North York (CA)

(72) Inventors: Daniel K. Cook, Oshawa (CA); David A. Turk, Downsview (CA); Zhi Yong Su, Shenzhen (CN)

(73) Assignee: Alfred International Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/223,793

(22) Filed: Jul. 19, 2023

(65) Prior Publication Data

US 2023/0366239 A1 Nov. 16, 2023

Related U.S. Application Data

(63) Continuation of application No. 17/142,141, filed on Jan. 5, 2021, now Pat. No. 11,732,504.

(60) Provisional application No. 62/957,950, filed on Jan. 7, 2020.

(51) Int. Cl.

| | |
|---|---|
| ***E05B 47/00*** | (2006.01) |
| ***E05B 41/00*** | (2006.01) |
| ***G07C 9/33*** | (2020.01) |

(52) U.S. Cl.
CPC .......... *E05B 47/0012* (2013.01); *E05B 41/00* (2013.01); *G07C 9/33* (2020.01); *E05B 2047/0017* (2013.01); *E05B 2047/0091* (2013.01); *E05B 2047/0095* (2013.01); *E05Y 2900/132* (2013.01)

(58) Field of Classification Search
CPC .. E05B 47/00; E05B 47/0001; E05B 47/0012; E05B 2047/0017; E05B 2047/0091; E05B 2047/0083; E05B 2047/0095; G07C 9/00; G07C 9/30; G07C 9/33
USPC .............................................................. 70/91
See application file for complete search history.

(56) References Cited

U.S. PATENT DOCUMENTS

| | | | | |
|---|---|---|---|---|
| 6,938,445 | B2 * | 9/2005 | Huang | E05B 41/00 70/432 |
| 2015/0368940 | A1 * | 12/2015 | Maeng | E05B 47/02 74/661 |
| 2016/0189503 | A1 * | 6/2016 | Johnson | E05B 47/00 348/152 |
| 2017/0076520 | A1 * | 3/2017 | Ho | G07C 9/00563 |
| 2018/0112438 | A1 * | 4/2018 | Guma | E05B 63/0065 |
| 2018/0187452 | A1 * | 7/2018 | Hsu | E05B 41/00 |

* cited by examiner

*Primary Examiner* — Nathan Cumar
(74) *Attorney, Agent, or Firm* — Smart & Biggar LP

(57) ABSTRACT

A motorized lock assembly and a method of motorizing a lock installed in a door. The motorized lock assembly including a motorized drive assembly to be mounted to an interior side of the door in driving engagement with a bolt assembly of the lock. The motorized lock assembly also including a communications assembly to receive an instruction from a user and to direct an operation of the motorized drive assembly in response to the instruction from the user.

22 Claims, 9 Drawing Sheets

MOTORIZED LOCK METHOD AND ASSEMBLY

CROSS REFERENCE TO RELATED APPLICATIONS

This application is a continuation of U.S. patent application Ser. No. 17/142,141 filed on Jan. 5, 2021 by the present inventors, and entitled MOTORIZED LOCK METHOD AND ASSEMBLY, which itself claims the benefit of U.S. Provisional Patent Application Ser. No. 62/957,950 filed on Jan. 7, 2020 by the present inventors, and entitled MOTORIZED LOCK METHOD AND ASSEMBLY, the entire contents of each of which are hereby incorporated by reference herein.

TECHNICAL FIELD

This disclosure relates to locks, and more particularly, to electronic motorized locks installed in doors.

BACKGROUND

In recent times there has been an interest in developing electronic door locks. Electronic locks may be more convenient for users, such as if a user is able to enter a passcode or scan a card rather than insert a key.

Various electronic door locks have been developed. Many of these electronic door locks include a touchpad or sensor and a solenoid. The solenoid is activated or deactivated when a correct entry code is entered at the touchpad or an access card is sensed by the sensor. Activation or deactivation may disengage a lock governed by the solenoid to allow a door to be opened by a user.

However, many electronic locks require specialized installation expertise or conditions. In many cases, doors must be customized to fit the electronic door lock, such as by enlarging standard sized openings. Some electronic locks may have security flaws, such as locks which are deactivated by power failure or which fail to incorporate a deadbolt. Some locks may have safety flaws, such as having no manual override option to allow emergency operation during power failure events.

Further, many electronic locks are expensive to install, particularly when installed as a replacement for an existing manual lock. New hardware may be expensive. Replacement may also involve considerable labor expense. Labor expense may be a concern particularly for certain locks, such as mortise locks, which may be more difficult to install than others and correspondingly more expensive to switch out. Expense may be a particular concern for large projects such as replacing all of the unit front door locks in a condo complex.

There is accordingly a need for an improved electronic door lock, which does not suffer from at least some of the limitations or disadvantages of known electronic door locks.

SUMMARY

In a first aspect, some embodiments of the invention provide a motorized lock assembly for installation in a door, comprising: a lock to be installed in the door to hold the door in position relative to a frame, the lock including a bolt assembly having a deadbolt and a bolt driver, the bolt driver operable to move the deadbolt between an extended locked position and a retracted unlocked position; a drive assembly to be mounted to an interior side of the door, the drive assembly having: a drive assembly housing having a front face and a rear face, a drive shaft extending from the rear face of the drive assembly to operatively engage the bolt driver of the bolt assembly installed in the door, a power source secured to the drive assembly housing, and a motor coupled to the power source and to the drive shaft to move the drive shaft to operate the bolt driver when the drive shaft is operatively engaged with the bolt driver installed in the door; and a communications assembly including: an exterior control panel to receive the instruction from the user, the exterior control panel to be mounted to an exterior side of the door; and a communications cable to join the exterior control panel and the motor of the drive assembly through the door, the communications cable including an exterior end to be attached to the exterior control panel and an interior end to be attached to the drive assembly to communicatively couple the exterior control panel to the motor to direct an operation of the motor in response to the instruction from the user.

In some embodiments, the exterior control panel includes a touchpad to receive the instruction from the user, and the touchpad displays at least nine alphanumeric symbols when activated, and the touchpad displays a predetermined pattern of the at least nine symbols in response to receiving the instruction to show that the instruction is a correct code.

The communications assembly may further comprise a proximity sensor to receive the instruction from the user by sensing a user device in proximity to the proximity sensor.

The drive assembly may further comprise a manual thumb turn for manual operation of the drive shaft of the drive assembly.

The drive assembly may further comprise a lock position indicator secured to the drive assembly housing and automatically moved between a locked position and an unlocked position in response to the bolt position to provide a visual indication of a door lock status, the lock position indicator being separate from the thumb turn, wherein the unlocked position of the lock position indicator is a retracted position in which a proximate portion of the lock position indicator is retracted within the drive assembly housing and the locked position is an extended position in which the proximate portion projects from the drive assembly housing.

The drive assembly mounted to the interior side of the door may further comprise an auto lock button communicatively coupled to the motor to direct the motor to extend the deadbolt.

The drive shaft may include a tailpiece to drivingly engage a bolt assembly of the lock by extending into a thumb turn slot in the bolt assembly.

The lock may be a mortise lock having an internal handle and an external handle, and the external handle is also locked when the deadbolt is in the extended locked position.

In a second aspect, some embodiments of the invention provide a lock motorization assembly, comprising: a drive assembly to be mounted to an interior side of a door, the drive assembly having: a drive assembly housing having a front face and a rear face, a drive shaft extending from the rear face of the drive assembly housing to operatively engage a bolt driver of a bolt assembly installed in the door, a power source secured to the drive assembly housing, and a motor coupled to the power source and to the drive shaft to move the drive shaft to operate the bolt driver when the drive shaft is operatively engaged with the bolt driver installed in the door; and a communications assembly including: an exterior control panel to receive the instruction from the user, the exterior control panel to be mounted to an exterior side of the door; and a communications cable to join the exterior control panel and the motor of the drive assembly through the door, the communications cable including an exterior end to be attached to the exterior control panel and an interior end to be attached to the drive assembly to communicatively couple the exterior control panel to the motor to direct an operation of the motor in response to the instruction from the user.

In some embodiments, the exterior control panel includes a touchpad to receive the instruction from the user, and the touchpad displays at least nine alphanumeric symbols when activated, and the touchpad displays a predetermined pattern of the at least nine symbols in response to receiving the instruction to show that the instruction is a correct code.

The communications assembly may further comprise a proximity sensor to receive the instruction from the user by sensing a user device in proximity to the proximity sensor.

The drive assembly may further comprise a manual thumb turn for manual operation of the drive shaft of the drive assembly.

The drive assembly may further comprise a lock position indicator secured to the drive assembly housing and automatically moved between a locked position and an unlocked position in response to the bolt position to provide a visual indication of a door lock status, the lock position indicator being separate from the thumb turn, wherein the unlocked position of the lock position indicator is a retracted position in which a proximate portion of the lock position indicator is retracted within the drive assembly housing and the locked position is an extended position in which the proximate portion projects from the drive assembly housing.

The drive assembly mounted to the interior side of the door may further comprise an auto lock button communicatively coupled to the motor to direct the motor to extend the deadbolt.

The drive shaft may include a tailpiece to drivingly engage a bolt assembly of the lock by extending into a thumb turn slot in the bolt assembly.

The lock may be a mortise lock having an internal handle and an external handle, and the external handle is also locked when the deadbolt is in the extended locked position.

In a third aspect, some embodiments of the invention provide a method of motorizing a lock installed in a door, comprising: mounting a motorized drive assembly to an interior side of the door; attaching a drive shaft of the motorized drive assembly to a bolt assembly of the lock in driving engagement with the bolt assembly to extend and retract a deadbolt of the bolt assembly, the motorized drive assembly including a motor coupled to the drive shaft to move the drive shaft; mounting a control panel to an exterior side of the door to receive an instruction from a user; coupling a first end of a communications cable to the control panel mounted to the exterior side of the door; extending the communications cable through the door; coupling a second end of the communications cable to the motorized drive assembly mounted to the interior side of the door to communicatively couple the control panel to the motor of the motorized drive assembly via the communications cable to direct an operation of the motor in response to the instruction from the user.

The method may further comprise, following coupling a second end of the communications cable to the motorized drive assembly mounted to the interior side of the door to communicatively couple the control panel to the motor of the motorized drive assembly via the communications cable, providing the instruction via a sensor of the control panel by operating the sensor to detect an authorized user device or authorized key card in proximity to the sensor.

The method may further comprise, following coupling a second end of the communications cable to the motorized drive assembly mounted to the interior side of the door to communicatively couple the control panel to the motor of the motorized drive assembly via the communications cable, extending the deadbolt by turning a thumb turn of the motorized drive assembly mounted to the interior side of the door.

The method may further comprise, following coupling a second end of the communications cable to the motorized drive assembly mounted to the interior side of the door to communicatively couple the control panel to the motor of the motorized drive assembly via the communications cable, actuating the motor to extend the deadbolt by pressing an auto lock button of the motorized drive assembly mounted to the interior side of the door.

BRIEF DESCRIPTION OF THE DRAWINGS

The drawings included herewith are for illustrating various examples of systems, methods, and apparatus of the present specification. In the drawings.

DETAILED DESCRIPTION

Various systems, methods and apparatus will be described below to provide an example of each claimed embodiment.

No embodiment described below limits any claimed embodiment and any claimed embodiment may cover systems, methods and/or apparatus that differ from those described below. The claimed embodiments are not limited to systems, methods and apparatus having all of the features of any one system, method and apparatus described below or to features common to multiple or all.

Figure 1:
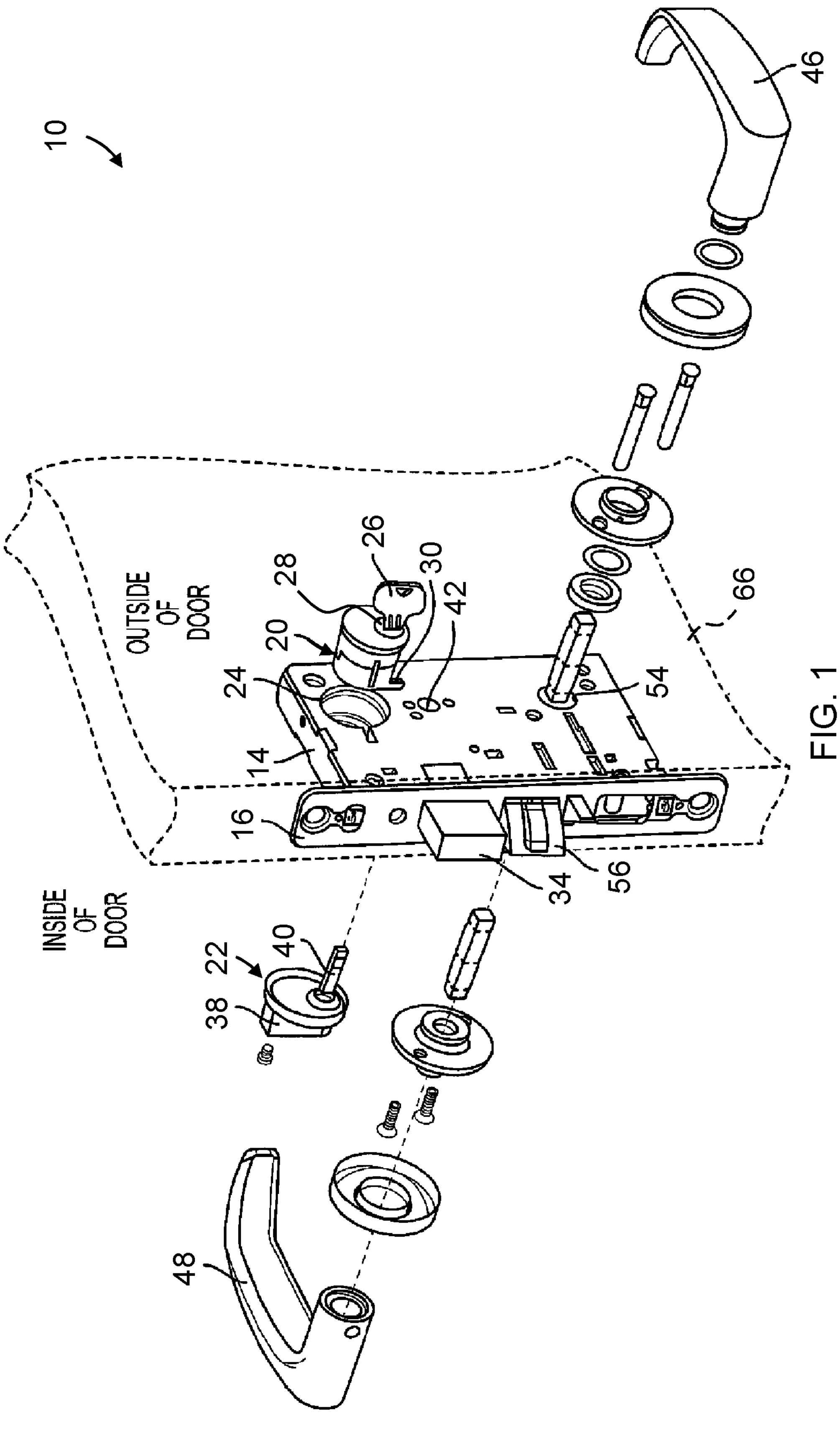
FIG. 1 (Prior Art)
FIG. 1 is a perspective exploded view of a prior art mortise door lock.

Referring to FIG. 1, an exemplary prior art mortise lock 10 includes a casing 14 and a faceplate 16. As with many mortise locks, casing 14 fits within a mortise opening in a door, such as the front door of a house. Mortise lock 10 includes a lock cylinder 20 for an outer side of the structure and a thumb turn 22 for an inner side of the structure.

When lock cylinder 20 is received in lock cylinder opening 24 of mortise lock 10, rotation of a matching key 26 in lock cylinder 20 turns a cylinder plug 28 in the lock cylinder 20 which operates a tail cam or arm 30 to engage the deadbolt assembly of the mortise lock 10. Rotation of the key 26 in one direction causes the deadbolt 34 to be extended and locks the mortise lock 10 while rotation of the key 26 in the opposite direction retracts deadbolt 34 and unlocks the mortise lock 10.

Similarly, rotation of the throw lever 38 of thumb turn 22 turns a blade shaft or tailpiece 40 which extends into a turn slot 42 in the deadbolt assembly of the mortise lock 10. When the thumb turn 22 on the inside of the door is turned in one direction, it retracts deadbolt 34. When turned in the opposite direction, the thumb turn 22 extends the deadbolt 34.

Mortise lock 10 has an outer lever handle 46, and an inner lever handle 48, which are connected via spindles 50, 52 to square opening 54 in a latch hub of the mortise lock 10. Rotation of spindles 50, 52 causes latch 56 to retract and withdraw into casing 14. Latch 56 may be biased into an extended position by a spring within casing 14.

A number of variations of mortise locks are available. For example, some mortise locks may otherwise drivingly engage a deadbolt assembly of a mortise lock, such as by including a thumb turn having a spindle to engage a square opening of a bolt assembly rather than a tailpiece to engage a slot of the bolt assembly. In some embodiments, when a bolt is extended one or both of the interior and exterior handles is also locked.

Figure 2:
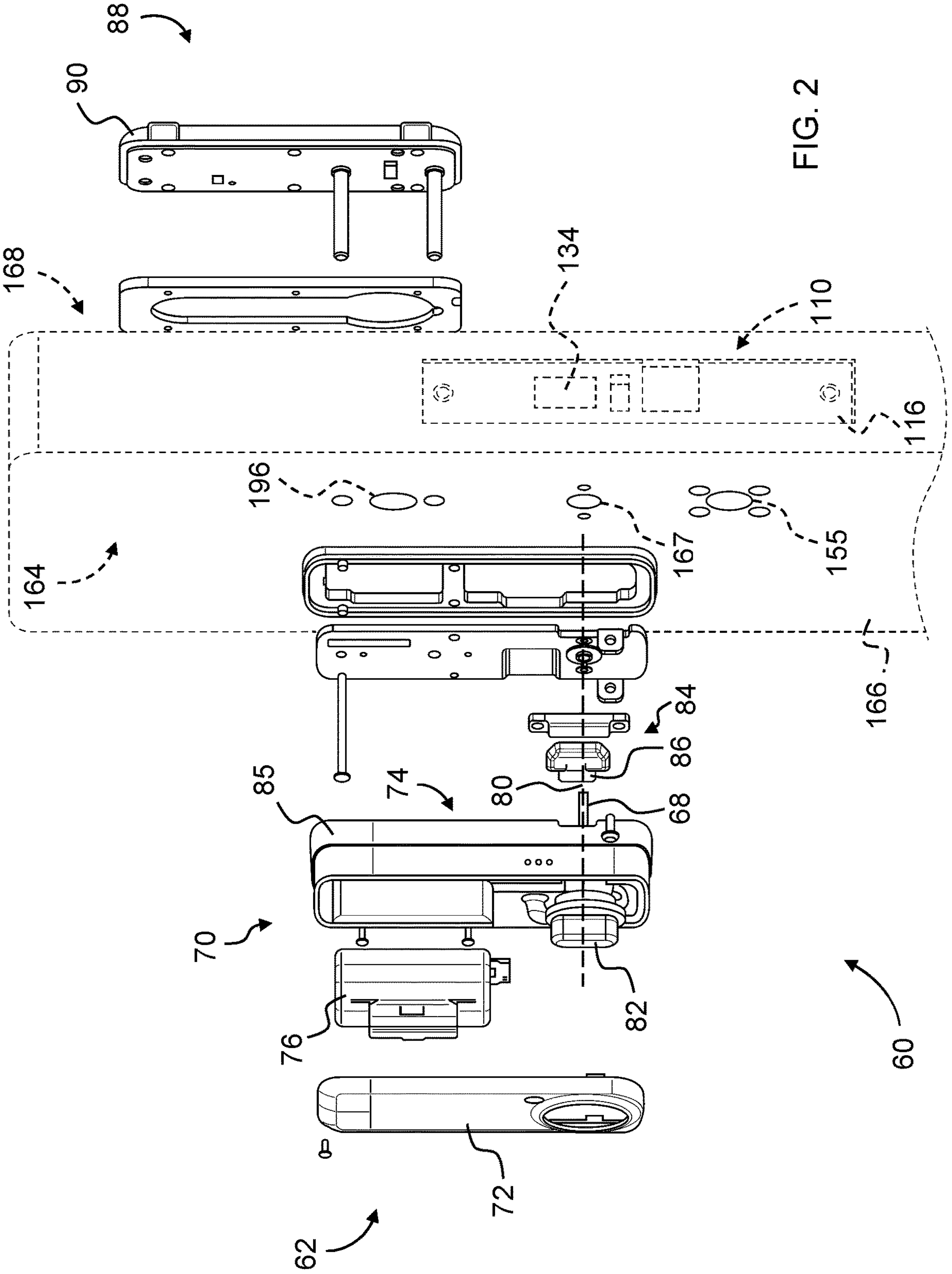
FIG. 2 is a perspective exploded view of a lock retrofit assembly in accordance with an embodiment.

Referring now to FIG. 2, an exemplary lock retrofit assembly 60 is shown with mortise lock 110 in door 166. Mortise lock 110 is similar in many respects to mortise lock 10, and like features are identified by like reference characters, incremented by 100. Door 166 is similar in many respects to door 66, and like features are identified by like reference characters, incremented by 100.

Lock retrofit assembly 60 includes a drive assembly 62 to be mounted to an interior side 164 of a door 166. The drive assembly 62 takes the place of a thumb turn of the mortise lock 110 and includes a drive shaft 68 to be inserted into thumb turn opening 167 to drivingly engage a bolt assembly of the mortise lock 110 in the place of the thumb turn of the mortise lock. Illustrated mortise lock 110 is an American National Standards Institute ('ANSI') 86 prep mortise lock. While lock retrofit assembly 60 is shown with a mortise lock, it will be appreciated that in some embodiments a lock retrofit assembly may be used with other types of locks having a thumb turn.

Drive assembly 62 includes a housing 70. Illustrated housing 70 includes an enclosure enclosing a central space and may be made of, for example, a hard plastic, zinc, aluminum, or other metal. Housing 70 has a front face 72 and a rear face 74. The front face 72 of illustrated housing 70 is a removable cover which may be removed to provide access to an interior or part of the interior of housing 70. Drive shaft 68 extends from rear face 74 to drivingly engage the bolt assembly of the mortise lock 110.

Illustrated drive assembly 62 also includes a power source 76. In this embodiment power source 76 is a rechargeable battery; however, other power sources may also be used, such as a power line to be connected to an environmental power supply or at least one non-rechargeable battery. In some embodiments, a battery is provided as a backup power source while a main power source is hard wired to the retrofit assembly from an environmental power supply. For hardwired power from an environmental supply, the housing 70 may include a connection port (not shown) for a power cable to receive power form the power cable carried from the environmental supply. Illustrated power source 76 is accessible when illustrated cover 72 is removed.

The illustrated drive assembly 62 also includes an electric motor as described further below. The electric motor is coupled to power source 76 to receive electric power, and is coupled to drive shaft 68 to move drive shaft 68 to retract or extend the bolt of the mortise lock 110.

Exemplary lock retrofit assembly 60 also includes a communications assembly 88 communicatively coupled to the motor 78 of the drive assembly to receive an instruction from a user and to direct an operation of the motor 78 in response to the instruction from the user.

Various communications assemblies may be used. For example, a communications assembly may include a sensor to sense a nearby key card or a smartphone or other portable device. In another example, a communications assembly may include a Bluetooth transceiver to receive an instruction from a Bluetooth transmitter such as a smartphone.

In some embodiments, a lock retrofit assembly may be remotely accessible, such as to allow a user to activate a motor of a motorize drive assembly remotely. For example, a communications assembly or system may include Z-wave hardware and software or a Wi-Fi bridge to communicatively couple the lock retrofit assembly with the Internet or other network.

In some embodiments, a user can connect to a lock retrofit assembly through a network such as the Internet and control the lock remotely, such as by using Google or Alexa voice control using a smart speaker or through a phone connected to a vehicle audio system. In some embodiments, a connected lock retrofit assembly may be controlled using a Z-wave or ZigBee module.

In some embodiments, a communications assembly may include one or more visual or auditory input or output devices such as microphones, lights, and speakers. For example, a user may be able to speak into a microphone to provide an instruction.

Visual or auditory input or output devices may also provide information, such as indicating that a battery charge is low, announcing whether the bolt has been retracted to let a user know when to pull on the handle to open the door, indicating a green light for an unlocked door and a red light for a locked door, or providing other information. For example, since the user may not know how long it takes for the bolt to be retracted once a correct entry code is entered, a speaker may be provided to announce 'door opened' once the bolt is fully retracted. A speaker may also be used to provide guidance to a user regarding how to operate the retrofit assembly.

In the illustrated example, the communications assembly 88 includes an exterior control panel 90 to be mounted to an exterior side 168 of the door 166. The control panel 90 may be hardwired to the interior drive assembly, such as by a cable passing through the door as will be described further below.

Figure 3:
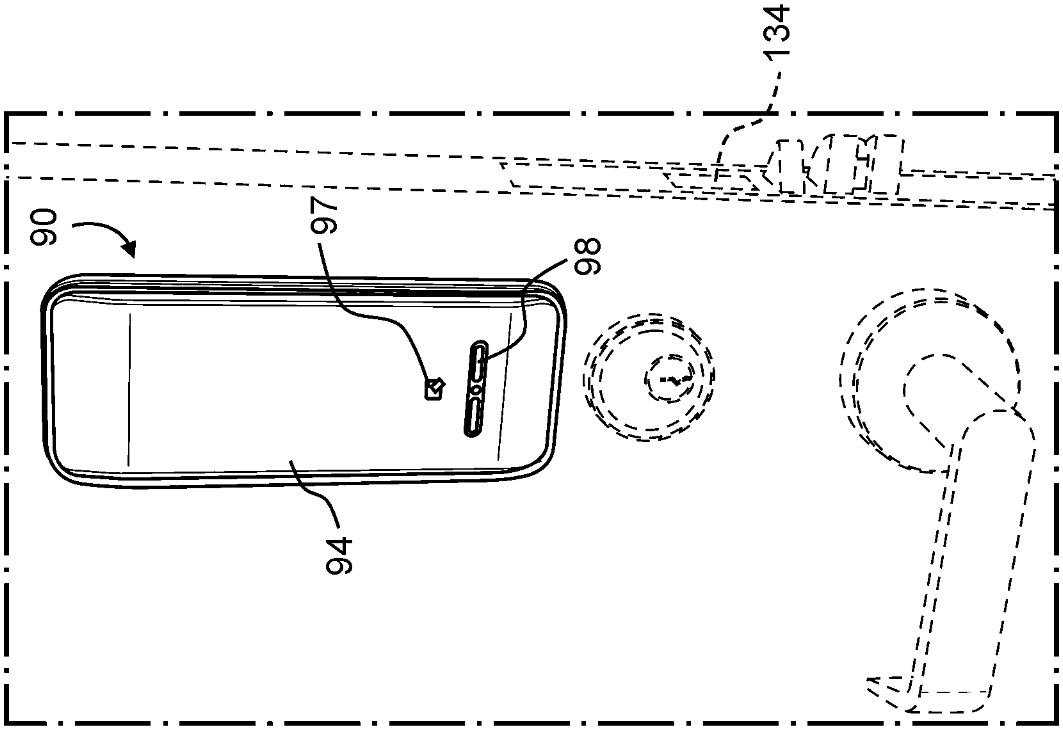
FIG. 3 is a perspective view of a portion of an exterior side of a door with the lock retrofit assembly of FIG. 2 installed on the door.

Referring now to FIG. 3, the exterior control panel 90 has a touchpad 94 to receive the instruction from the user. Instruction may be in the form of an alphanumeric code input, a fingerprint scan, or similar. Touchpad 94 of the illustrated example may display at least nine alphanumeric symbols and may receive an instruction from a user when the use enters an entry code by touching the alphanumeric symbols. For example, a lock retrofit assembly 60 may include a memory, such as a memory capable of storing hundreds of entry codes, and may accept entry codes of predetermined length, such as between 4 and 10 characters, for comparison to a set of stored acceptable entry codes.

In some embodiments, touchpad 94 may indicate whether a code is an acceptable entry code, such as by displaying a predetermined pattern of the alphanumeric symbols. For example, touchpad 94 may generally display numbers 1 to 9 arranged in a standard numeric keypad grid, and when an acceptable entry code is entered the touchpad 94 may display numbers 1 to 4 and 6 to 9 without number 5 to form an 'O' shape. In another example, touchpad 94 may display 1, 3, 5, 7, and 9 when an unacceptable entry code is entered to form an 'X' shape.

Illustrated lock retrofit assembly 60 is also configured for use with an access card. Illustrated control panel 90 includes an indicator 97 showing where an access card should be provided to be detected by a proximity sensor (not shown) as an alternative way of providing the instruction from the user to unlock the mortise lock 110. Communications system 88 also includes a Bluetooth transceiver (not shown) to allow a proximate smartphone or other portable device to provide the instruction to the communications system 88 to move the drive shaft 68 as an alternative to a code or card.

A power failure jump port 98 is also provided for providing power to lock retrofit assembly 60 from an outer side of door 166, such as to provide emergency recharging for the rechargeable battery power source 76 if necessary. For example, a power failure jump port 98 may be a Micro USB port and/or a 9 volt jump port. Communications cable 92 may also be or include or run parallel to a power cable to supply power from the power source 76 to the control panel 90 and/or to supply power from the power failure jump port 98 to the power source 76.

Figure 4:
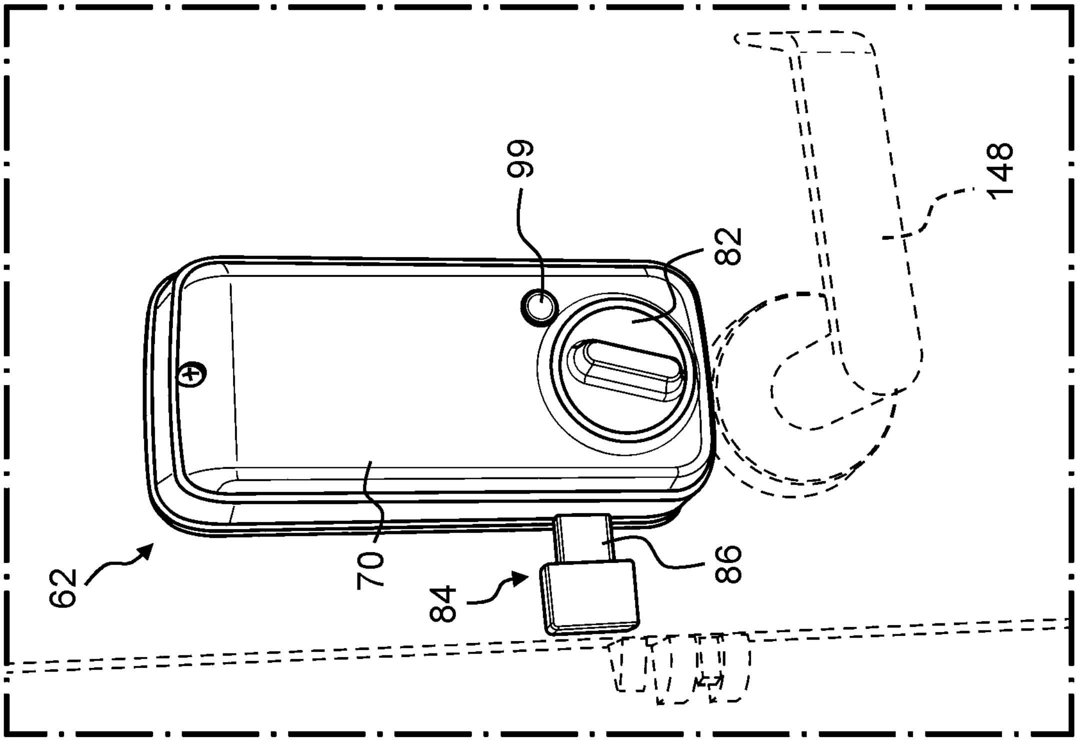
FIG. 4 is a perspective view of a portion of an interior side of the door with the lock retrofit assembly of FIG. 2 installed on the door.

Referring now to FIG. 4, the drive assembly 62 is shown with an optional manual thumb turn 82. Manual thumb turn 82 is coupled to the drive shaft 68 and allows manual movement of the drive shaft as an alternative to the motor 78. Manual thumb turn 82 may allow a user to control the mortise lock 110 from the inner side of the door without activating motor 78.

An optional position indicator 84 is shown extended out from housing 70. Lock position indicator 84 is secured to a side face 85 of drive assembly housing 70 and moveable between a locked position and an unlocked position to provide a visual indication of a door lock status. The unlocked position of the lock position indicator is a retracted position in which a proximate portion 86 of the lock position indicator 84 is retracted within the drive assembly housing 70. The locked position is an extended position in which the proximate portion 86 projects from the drive assembly housing 70. Lock position indicator 84 may be coupled to the drive shaft 68 within housing 70 and may be extended or retracted as the drive shaft 68 extends or retracts the bolt in the deadbolt assembly of mortise lock 110.

The illustrated example also shows an optional auto lock button 99 provided on housing 70 adjacent thumb turn 82. Auto lock button 99 may be connected to communications assembly 88 as an alternative way for a user to provide an instruction to lock mortise lock 110. Pressing auto lock button 99 when mortise lock 110 is unlocked my activate motor 78 to lock mortise lock 110.

In some embodiments, a lock retrofit assembly may have a default lock or unlock setting. For example, the lock retrofit assembly 60 may keep mortise lock 110 locked by default. When the motor 78 is activated, the lock retrofit assembly 60 may retract the bolt 134 and/or unlock the exterior handle. The lock retrofit assembly 60 may then extend the bolt 134 automatically after a predetermined length of time, such as a time between 1 second and 180 seconds. In some embodiments, the automatic relock may be delayed by a time sufficient for a user to open the door and allow the door to fall shut, such as between 15 and 60 seconds. In some embodiments, the automatic relock may be triggered by a sensor detecting that the door has been opened and has returned to a closed position, such as a proximity sensor placed on the control panel 90, drive assembly 62, and/or a periphery of the door or frame to detect the position of the door relative to the door frame.

Figure 6:
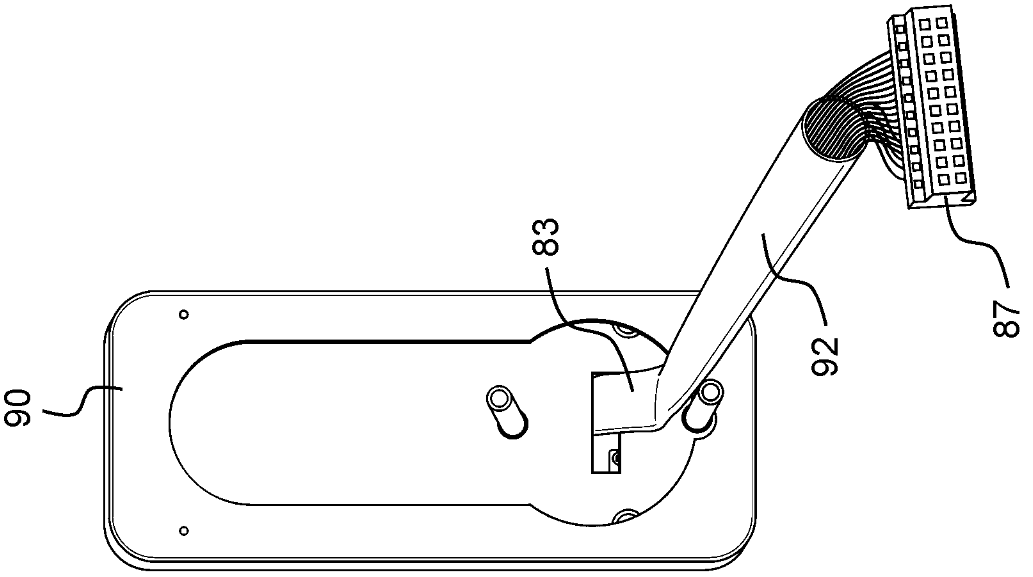
FIG. 6 is a perspective rear view of the control panel and communications cable of the lock retrofit assembly of FIG. 2.
Figure 5:
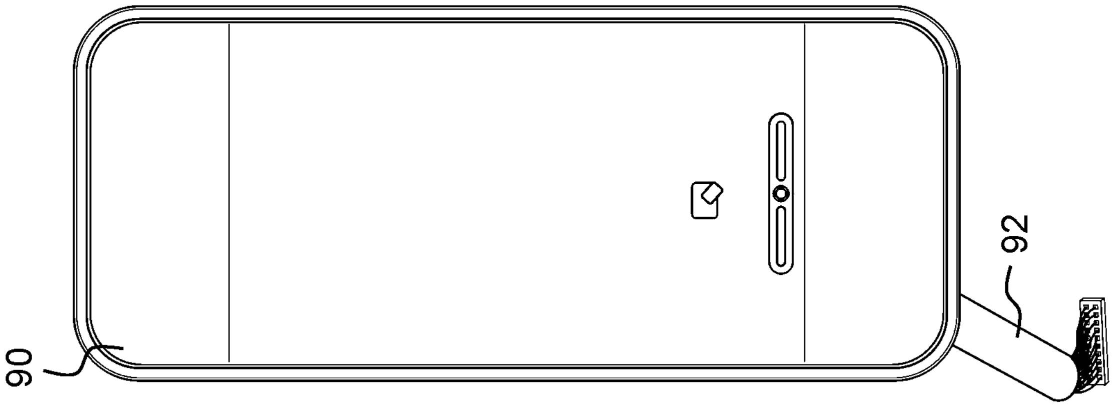
FIG. 5 is a perspective front view of a control panel and communications cable of the lock retrofit assembly of FIG. 2.

Referring now to FIGS. 5 and 6, control panel 90 is shown with communications cable 92. An exterior end 83 of the illustrated communications cable 92 is attached to the exterior touchpad control panel 90. An interior end 87 of the communications cable 92 is provided to be attached to the drive assembly 62 to allow an instruction received at the exterior touchpad control panel 90 to be transmitted to the interior motorized drive assembly 62 through the door via the communications cable 92. For example, an acceptable entry code may entered at touchpad 94 and interpreted as an instruction to retract the bolt 134 of the mortise lock 110 in the door 166 by moving the drive shaft 68 of the motorized drive assembly 62.

Figure 7:
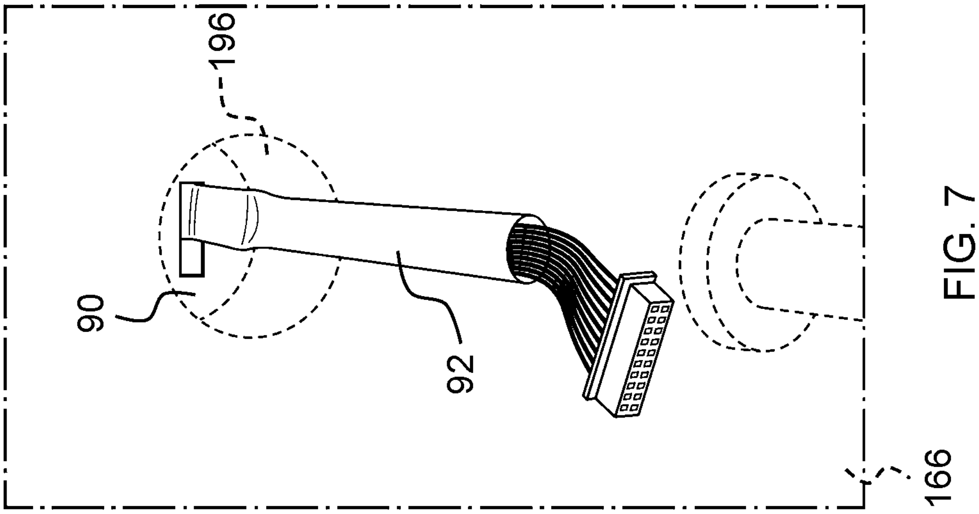
FIG. 7 is a perspective view of a portion of the interior side of the door with the control panel of the lock retrofit assembly of FIG. 2 installed on the exterior side of the door and the communications cable extended through an aperture in the door.

Referring now to FIG. 7, the illustrated communications cable 92 is passed through a communications aperture 196 in door 166 join the exterior control panel 90 and the drive assembly 62. Communications system 88 may join the control panel 90 to the motor 78 of the interior drive assembly 62 through the door 166 via the communications cable 92. In some embodiments, a user may need to prepare the communications aperture 196, such as by drilling or otherwise cutting a hole through the door. The communications aperture 196 may be prepared adjacent the thumb turn opening 167 so that the communications cable 92 may be attached to a rear surface 74 of drive assembly 62 that is mounted over thumb turn opening 167.

Figure 8:
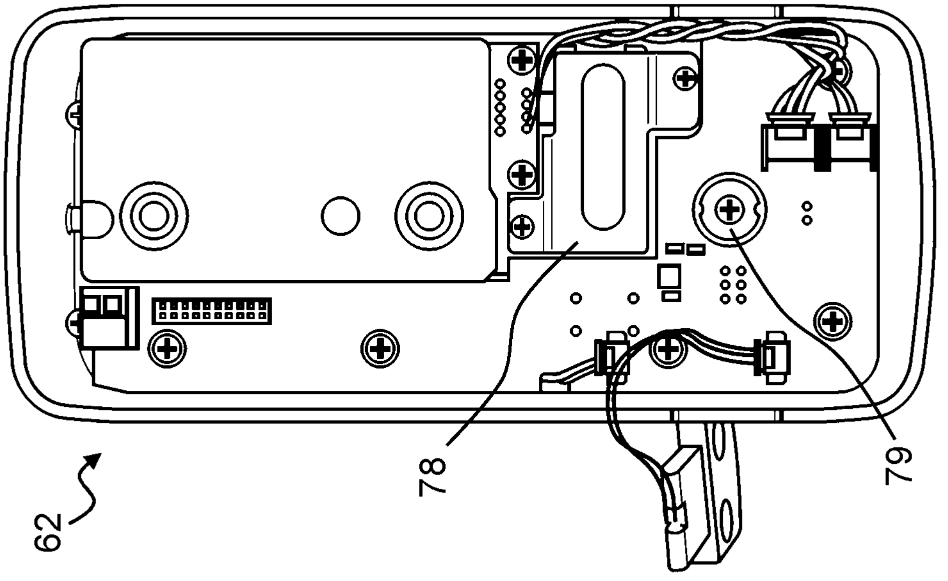
FIG. 8 is a rear plan view of a drive assembly of the lock retrofit assembly of FIG. 2.

Referring now to FIG. 8, illustrated drive assembly 62 includes an electric motor 78 which may be coupled to power source 76 (FIG. 2) to receive power from the power source. The motor 78 is also communicatively coupled to communications system 88 (FIG. 2) to be directed by the communications system 88. Illustrated motor 78 includes a drive shaft interface 79 to join the motor 78 to the drive shaft 68. When drive shaft 68 is received in drive shaft interface 79 the motor 78 may move the drive shaft 68 as directed by the communications system 88.

Figure 9:
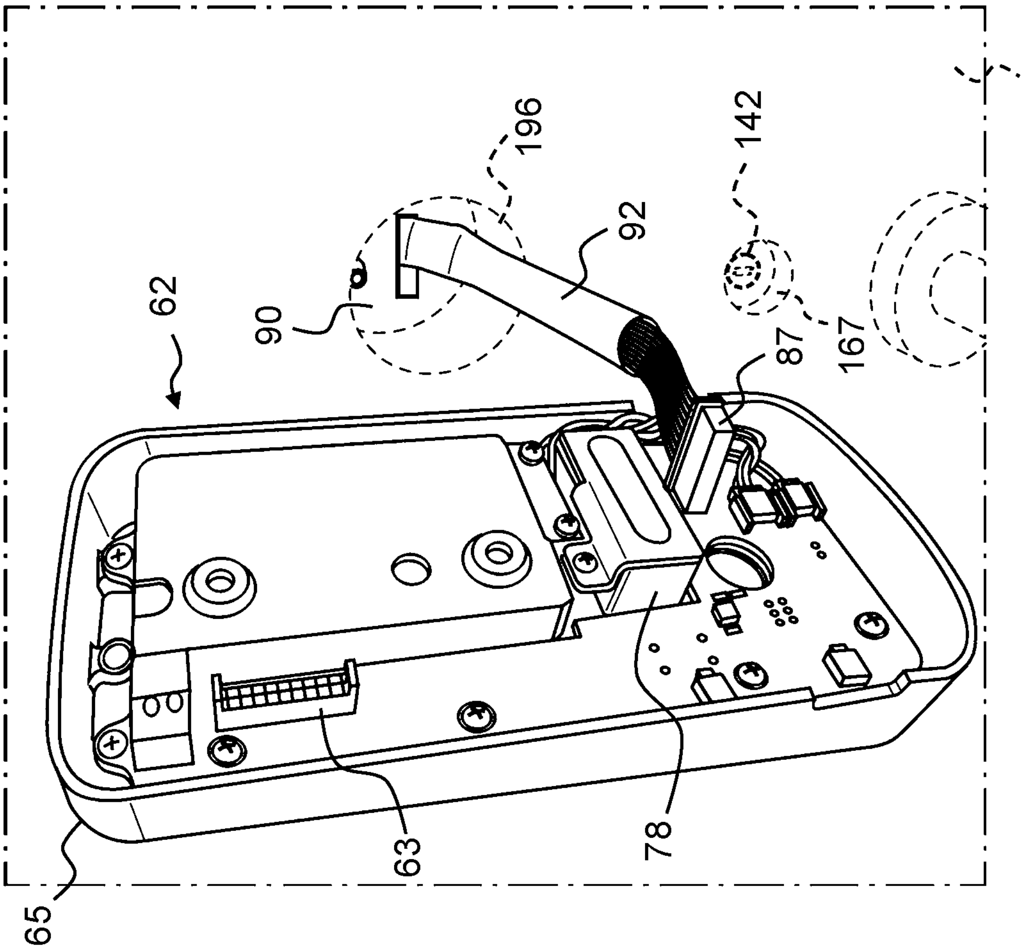
FIG. 9 is a perspective view of the drive assembly of the lock retrofit assembly of FIG. 2 adjacent the portion of the door of FIG. 7.

Referring now to FIG. 9, drive assembly 62 may be joined at communications interface 63 to communications cable 92 at an internal end 87 of communications cable 92. Drive assembly 62 may be mounted over thumb turn opening 167 with drive shaft interface 79 aligned with thumb turn opening 167. Communications aperture 196 is adjacent thumb turn opening 167, and so drive assembly 62 may be mounted over thumb turn opening 167 without communications cable 92 extending beyond a periphery 65 of drive assembly 62 or otherwise visible from an interior side of door.

Figure 12:
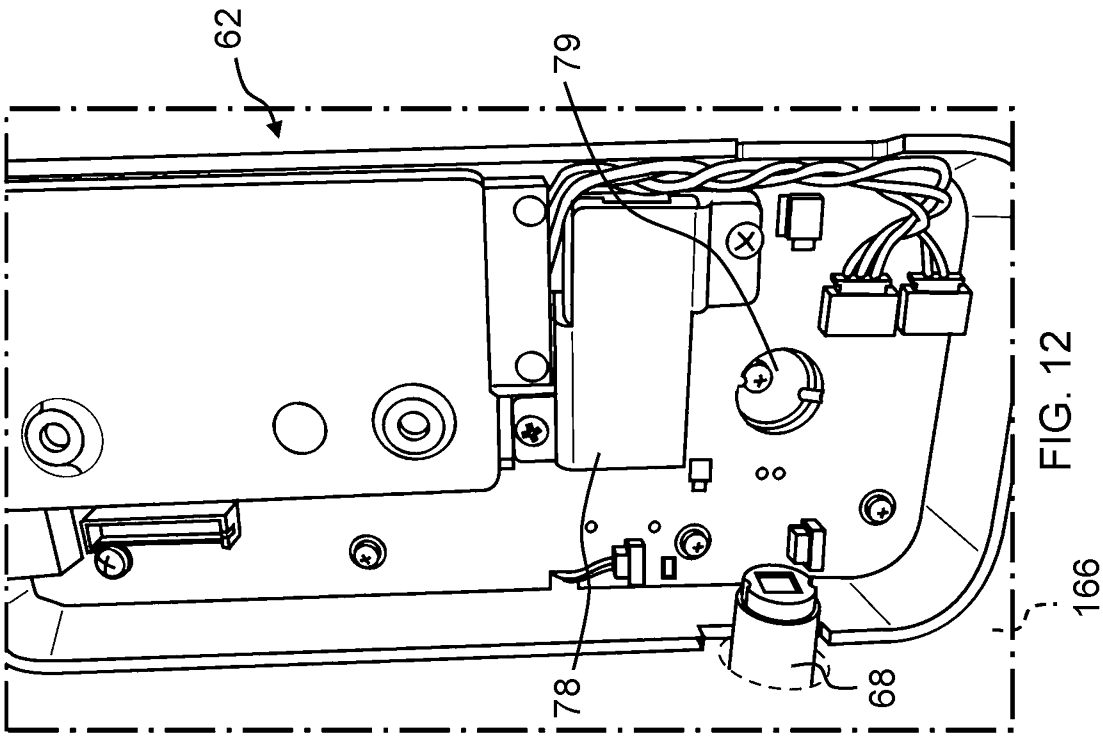
FIG. 12 is a perspective view of the portion of the inside of the door of FIG. 11 with the drive assembly housing adjacent the drive shaft.
Figure 11:
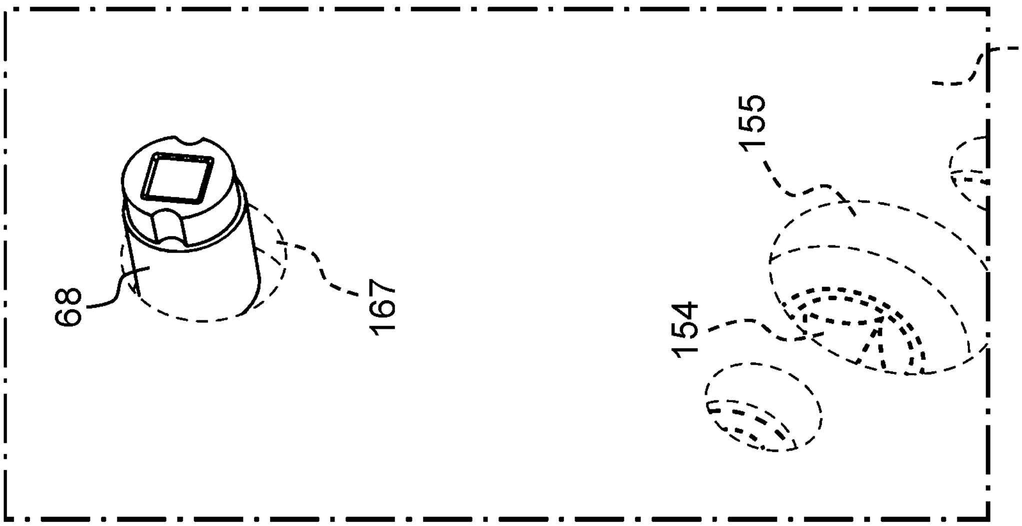
FIG. 11 is a perspective view of a portion of the inner side of the door with the drive shaft of FIG. 10 installed in a thumb turn opening of the door.
Figure 10:
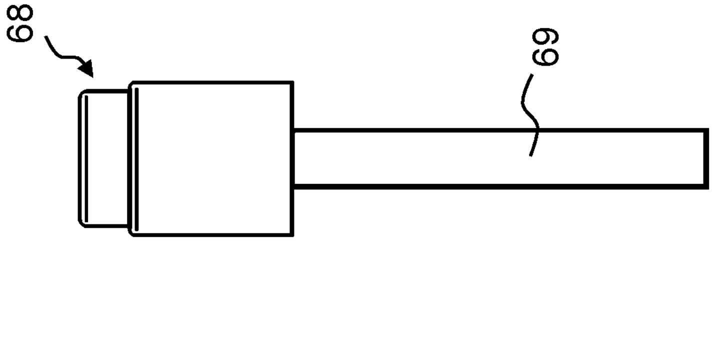
FIG. 10 is a perspective view of a drive shaft of the lock retrofit assembly of FIG. 2.

Referring now to FIGS. 10 to 12, illustrated drive shaft 68 includes a tailpiece 69 to drivingly engage the bolt assembly of mortise lock 110. Tailpiece 69 may be inserted through thumb turn opening 167 and into turn slot 142 (FIG. 9). Once inserted into turn slot 142 of the bolt assembly of mortise lock 110, rotation of tailpiece 69 causes rotation of the turn slot 142 and retraction or extension of the bolt 134 of mortise lock 110.

Drive shaft 68 may be moved by motor 78 of drive assembly 62 when drive shaft 68 is secured to drive shaft interface 79 of motor 78. Since illustrated drive shaft 68, having a tailpiece 69 for insertion into turn slot 142, motor 78 is coupled to the drive shaft 68 to rotate the driveshaft 68 around axis 80 of driveshaft 68 to rotate the turn slot 142. However, in other embodiments the drive assembly 62 may drivingly engage the bolt assembly in other ways.

Also illustrated in FIG. 11 is a square opening 154 of mortise lock 110. Square opening 154 is provided to receiving a spindle of an inner lever handle 148 passed through handle opening 155 in door 166.

Figure 13:
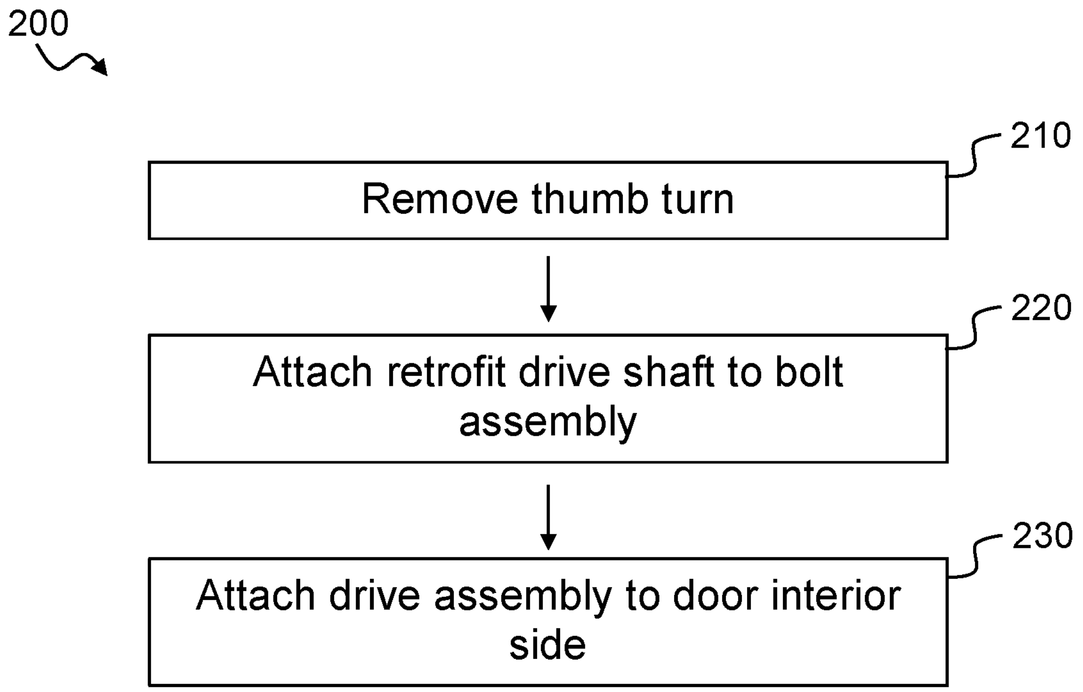
FIG. 13 is a flow chart of a method of retrofitting a lock in accordance with a first embodiment.

Referring now to FIG. 13, a method 200 of retrofitting a lock such as mortise lock 110 includes a step 210 of removing a thumb turn of the lock from an interior side of a door. Removing the thumb turn at step 210 may expose a bolt assembly of the lock within the door so that a motorized drive assembly can be drivingly engaged with the bolt assembly.

Method 200 also includes at step 220 attaching a drive shaft of a motorized drive assembly to the bolt assembly in driving engagement with the bolt assembly. The motorized drive assembly including a motor coupled to the drive shave to move the drive shaft, and drivingly engaging the drive shaft with the bolt assembly may allow the motorized drive assembly to extend and retract a deadbolt of the bolt assembly. At step 230 the motorized drive assembly is attached to the interior side of the door.

In some embodiments, the motorized drive assembly of the method 200 also includes a communications system to receive an instruction from a user and direct the actuation of the motor of the motorized drive assembly to lock or unlock the mortise lock. A communications system may be, for example, a proximity sensor to sense the proximity of a key card or a smartphone or other portable device, and identify the proximity of the key card or portable device as the instruction to activate the motor. A communications system may also or alternatively include a touchpad or other input device. A communications system may include an input device, such as a keypad, touchscreen control panel, sensor, or transceiver.

Figure 14:
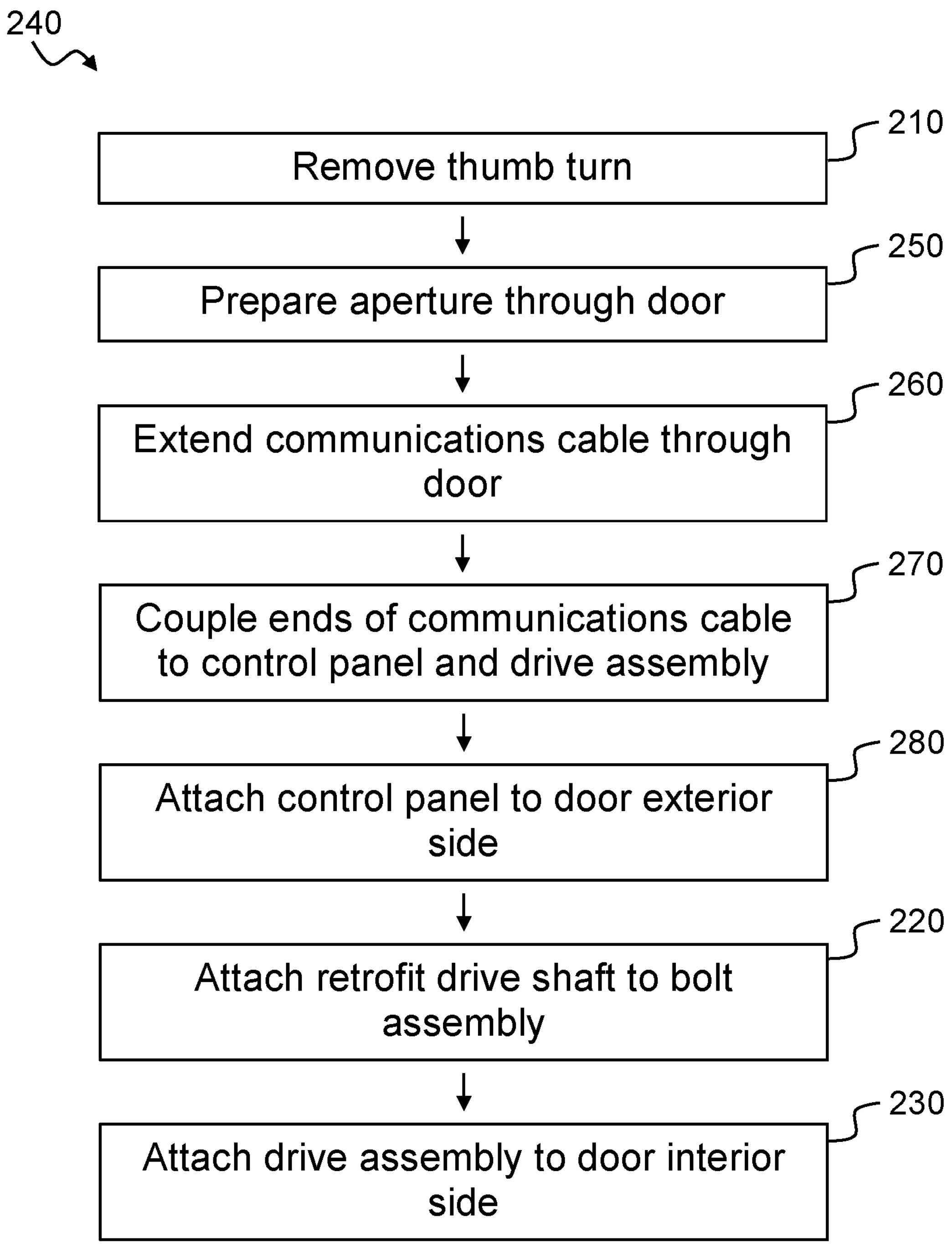
FIG. 14 is a flow chart of a method of retrofitting a lock in accordance with a second embodiment.

Referring now to FIG. 14, in some embodiments a method 240 of retrofitting a mortise lock includes an installation of a communications system in addition to steps 210, 220 and 230. At step 250 an aperture is prepared through a door, such as by drilling or otherwise cutting an opening through a door adjacent a thumb turn opening in the door. A communications cable is then extended through the door at step 260 by passing the cable through the aperture prepared at step 250.

At step 270 an exterior end of the communications cable may be attached to an exterior touchpad control panel. An interior end of the communications cable is attached to the motorized drive assembly to communicatively couple the control panel to the drive assembly.

The communications cable allows an instruction received at the exterior touchpad control panel to be transmitted to the interior motorized drive assembly through the door via the communications cable, such as an instruction to retract a bolt of the mortise lock in the door by moving the drive shaft of the motorized drive assembly. For example, a user may enter an entry code at a touchscreen control panel to direct the motor of a drive assembly to move the drive shaft and retract or extend the deadbolt of a mortise lock.

The exterior touchpad control panel is attached to the exterior side of the door at step 280. The touchpad control panel may be attached adjacent the lock cylinder of the mortise lock in the door, so that a user can easily access either the touchpad control panel or the lock cylinder at their option.

In some embodiments, a lock retrofit assembly may log lock or unlock events. For example, a lock retrofit assembly may include a storage device or may be communicatively coupled to an external storage device to log when the door is opened and by which code or key card or other instruction. A log of lock and unlock events may enable a user to keep track of entry and exit events and associate each event with a particular individual by way of the code or card used.

For example, a log may record that a first code was used to open the door from an exterior side at a first time, the door was automatically relocked when it returned to the frame after being opened, the door was unlocked by way of the manual thumb turn on the drive assembly at a second time later than the first time, and then the door was automatically relocked when it returned to the frame after being opened. In another example, a log may record that during a time frame in which the door was not set to automatically relock a first key card was used to open the door from an exterior side at a first item, the door was relocked from an interior side by pressing the auto lock button at a second time later than the third time, and then the door was unlocked at a third time from an interior by use of the manual thumb turn on the drive assembly.

A user may use the log to, for example, determine whether to revoke access to an individual by cancelling an entry code or card permission associated with the individual. In some embodiments, a user may cancel a permission, such as an entry code permission, remotely. For example, a user may use a mobile application connected to a communications system of a lock retrofit assembly to remove the entry code from a list of permitted or acceptable entry codes accessible by the communications system. In some embodiments, a user may cancel a permission using an input device coupled to the lock retrofit assembly, such as the touchpad coupled to the lock retrofit assembly.

In some embodiments, a lock retrofit assembly is provided along with a lock having a bolt assembly, the bolt assembly including a bolt driver and a deadbolt. A bolt driver may be a rotatable core secured to a guide for a deadbolt, the rotatable core operatively coupled to a deadbolt received in the guide to move the deadbolt in and out of an open end of the guide. A bolt driver may include a turn slot or other interface to receive a shaft from a thumb turn so that the thumb turn may drivingly engage the bolt assembly via the shaft of the thumb turn, the shaft extending through a thumb turn hole in the door from an inner side surface of the door to the bolt assembly installed in the door. In some embodiments, a lock retrofit assembly is manufactured separately from a lock but is to be installed concurrently. For example, lock retrofit assembly 60 may be provided along with mortise lock 110 to be installed at the same time.

In some embodiments, when the lock retrofit assembly is expected to take the place of the thumb turn, a lock may be provided without a thumb turn and/or installed without a thumb turn. For example, a method of installing a lock retrofit assembly may be similar to method 200 with step 210 replaced by a step of installing a lock without installing a thumb turn of the lock. With the lock installed without the thumb turn, a bolt assembly of the lock within the door remains exposed so that a motorized drive assembly of the lock retrofit assembly can be drivingly engaged with the bolt assembly.

Figure 15:
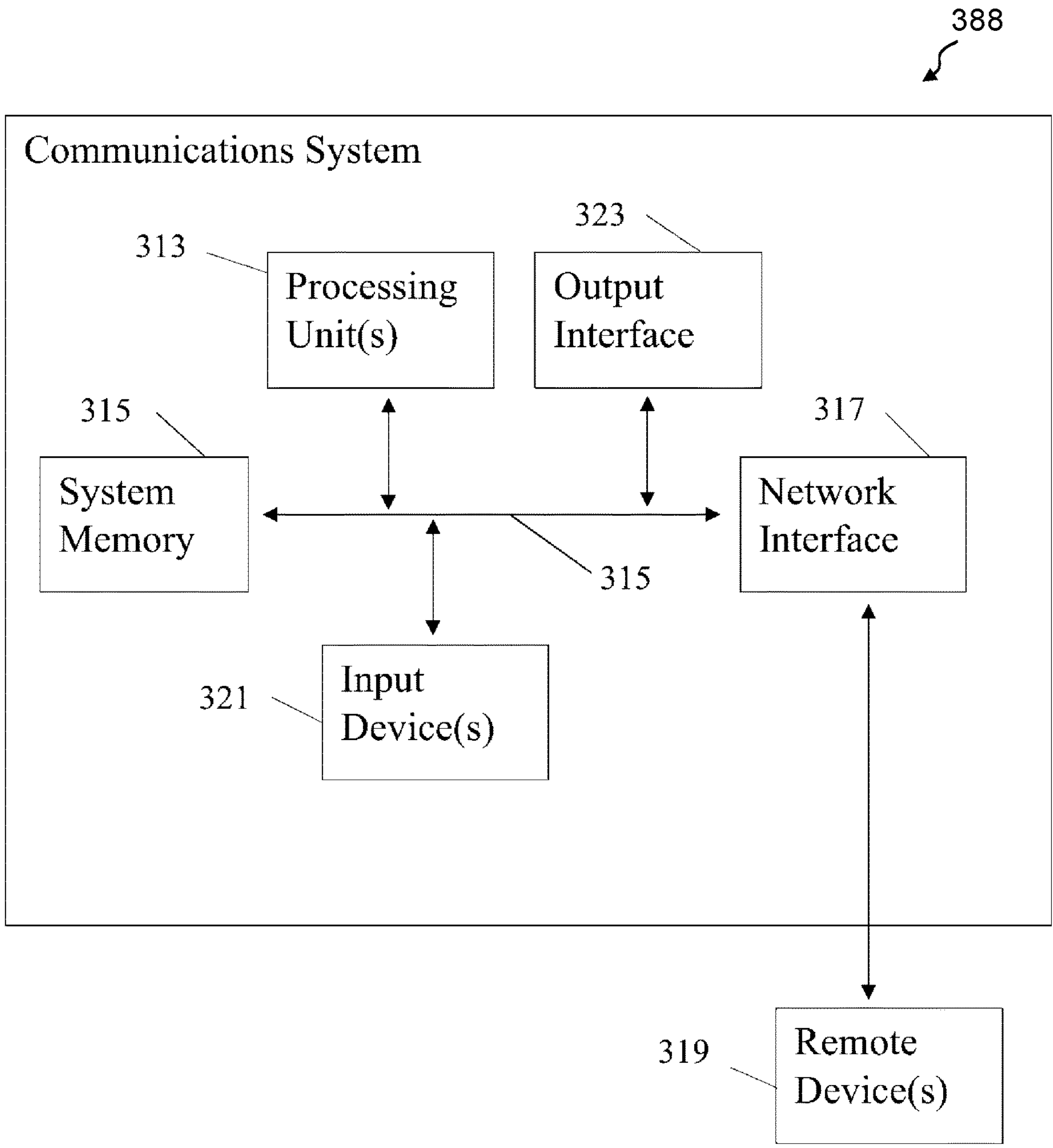
FIG. 15 is a schematic diagram of a communications system in accordance with an embodiment.

Referring now to FIG. 15, an embodiment of a lock retrofit communications system 388 is shown. Communications system 388 is similar in many respects to communications system 88, and like features are identified by like reference characters, incremented by 300.

Communications system 388 includes a processing unit 311 and a system memory 313 which may be interconnected across a system bus or network 315, or a distributed network accessing data through interface 317 connecting to one or more remote devices 319 such as servers or smartphones. The computer compilation system may have access to computer readable media, and the system memory may include computer readable storage media in the form of volatile and/or nonvolatile memory such as read only memory and/or random access memory. In some embodiments, system memory may include an operating system, application programs, and program data.

A user using the communications system 388 may interface through input devices 321, such as a touchpad or sensor, to provide information and instructions. An output interface may connect to the drive motor of a lock assembly, such as drive motor 78, to direct the operations of the drive motor. An output interface 323 may also or alternatively provide a user with information; for example, the output interface 323 may be a light, a speaker, a screen, or a network interface.

In some embodiments, remote devices 319 may be used to control communications system 388. For example, a smartphone remote device 319 may be used to direct a drive motor 78 to open, such as if the user of the smartphone remote device 319 has been informed that someone would like access through the door. In another example, a smartphone remote device 319 may be used to change an operational setting of the communications system 388, such as to direct the communications system 388 to only accept certain entry codes from a touchpad input device 321.

In some embodiments, a communications system 388 may be networked and operable as a distributed system, a communications system may also be able to access distributed databases for information or processing capability.

In some embodiments, a communications system may have one or more operational modes. For example, a communications system 388 may have a Privacy Mode in which only a master code or master access card and/or an authorized Bluetooth mobile application on a smartphone is able to unlock the door from the outside. A Privacy Mode may be used, for example, where a user having the Bluetooth mobile application on their smartphone wishes to temporarily block all additional access codes or cards for some reason.

Operational modes may also include an Away Mode, in which again only the Privacy Mode is activated and the system is also set to generate an alarm if the lock is opened or if the lock is opened by any means other than the master code or master access card and/or an authorized Bluetooth mobile application on a smartphone. An alarm may be an audible alarm sounded from a speaker of a lock retrofit assembly and/or an alert sent to a remote device such as a smartphone remote device. For example, if an Away Mode is activated on lock retrofit assembly 60 and the lock is then opened from the inside by rotation of manual thumb turn 82 a communications system may send a notice to a remote device such as a smartphone on which a Bluetooth mobile application is installed. An alarm may let a user know, for example, that someone may have passed through a door who should be informed that the Away Mode is active and that they will need the master code or card to get back through.

Operational modes may also include an Auto/Manual Mode in which a lock retrofit assembly automatically relocks after a period of time. For example, the Auto/Manual Mode may be as discussed above, in which a drive motor such as drive motor 78 automatically relocks a door after a predetermined period of time or after a door sensor senses that the door has been opened out of a frame and then returned to a closed position in the frame.

In some embodiments, an operational mode, such as a Privacy Mode, may be activated by a setting on the Bluetooth mobile application, such as if the Bluetooth mobile application is a remote device 319 connected to communications system 388 and can change the settings of the communication system 388. In some embodiments, an operational mode, such as a Privacy Mode, may be activated by physically manipulating a lock retrofit assembly, such as by holding down the auto lock button 99 of the lock retrofit assembly 60 for a predetermined time such as more than 2 seconds or more than 5 seconds.

While the above description provides examples of one or more apparatus, methods, or systems, it will be appreciated that other apparatus, methods, or systems may be within the scope of the claims as interpreted by one of skill in the art.

The invention claimed is:

1. A motorized mortise lock assembly for installation in a door, comprising:

- a mortise lock to be installed in the door to hold the door in position relative to a frame, the mortise lock including a bolt assembly having a deadbolt and a bolt driver, the bolt driver operable to move the deadbolt between an extended locked position and a retracted unlocked position, and wherein when the deadbolt is in the extended locked position the external handle is also locked against rotation to prevent the external handle from being used to withdraw a latch of the mortise lock;
- a drive assembly to be mounted to an interior side of the door, the drive assembly having:
  - a drive assembly housing having a front face and a rear face,
  - a drive shaft extending from the rear face of the drive assembly to operatively engage the bolt driver of the bolt assembly installed in the door,
  - a power source secured to the drive assembly housing, and
  - a motor coupled to the power source and to the drive shaft to move the drive shaft to operate the bolt driver when the drive shaft is operatively engaged with the bolt driver installed in the door; and
- a communications assembly including:
  - an exterior control panel to receive the instruction from the user, the exterior control panel to be mounted to an exterior side of the door; and
  - a communications cable to join the exterior control panel and the motor of the drive assembly through the door, the communications cable including an exterior end to be attached to the exterior control panel and an interior end to be attached to the drive assembly to communicatively couple the exterior control panel to the motor to direct an operation of the motor in response to the instruction from the user.

2. The motorized mortise lock assembly of claim 1, wherein the communications assembly further comprises a proximity sensor to receive the instruction from the user by sensing a user device in proximity to the proximity sensor.

3. The motorized mortise lock assembly of claim 1, wherein the drive assembly further comprises a manual thumb turn for manual operation of the drive shaft of the drive assembly.

4. The motorized mortise lock assembly of claim 3, wherein a communications interface of the drive assembly for coupling the interior end of the communications cable to the drive assembly is located on the drive assembly at a location that is sufficiently spaced from the drive shaft to overlie a portion of the door beyond a casing of the mortise lock when the casing of the mortise lock is installed in the door and the drive assembly is mounted to the interior side of the door with the drive shaft engaged with the bolt driver.

5. The motorized mortise lock assembly of claim 3, wherein the drive assembly has a first end to form an upper end when the drive assembly is installed on the door, and a communications interface of the drive assembly for coupling the interior end of the communications cable to the drive assembly is located on the drive assembly with a portion of the communications interface that is nearest to the first end is located closer to the first end than a portion of the drive shaft that is nearest to the first end.

6. A door comprising the motorized mortise lock assembly of claim 3 installed to the door with a casing of the mortise lock received in a mortise opening in the door and the communications cable extending through the door bypassing the casing.

7. The motorized mortise lock assembly of claim 1, wherein the drive shaft includes a tailpiece to drivingly engage a bolt assembly of the lock by extending into a thumb turn slot in the bolt assembly.

8. A mortise lock motorization assembly, comprising:
- a drive assembly to be mounted to an interior side of a door, the drive assembly having:
  - a drive assembly housing having a front face and a rear face,
  - a drive shaft extending from the rear face of the drive assembly housing to operatively engage a bolt driver of a mortise lock bolt assembly of a mortise lock installed in the door,
  - a power source secured to the drive assembly housing, and
  - a motor coupled to the power source and to the drive shaft to move the drive shaft to operate the bolt driver when the drive shaft is operatively engaged with the bolt driver installed in the door; and
- a communications assembly including:
  - an exterior control panel to receive the instruction from the user, the exterior control panel to be mounted to an exterior side of the door; and
  - a communications cable to join the exterior control panel and the motor of the drive assembly through the door while bypassing the mortise lock, the communications cable including an exterior end to be attached to the exterior control panel and an interior end to be attached to the drive assembly to communicatively couple the exterior control panel to the motor to direct an operation of the motor in response to the instruction from the user.

9. The mortise lock motorization assembly of claim 8, wherein the communications assembly further comprises a proximity sensor to receive the instruction from the user by sensing a user device in proximity to the proximity sensor.

10. The mortise lock motorization assembly of claim 8, wherein the drive assembly further comprises a manual thumb turn for manual operation of the drive shaft of the drive assembly.

11. The mortise lock motorization assembly of claim 10, wherein the drive assembly further comprises a lock position indicator secured to the drive assembly housing and moved between a locked position and an unlocked position to provide a visual indication of a door lock status, the lock position indicator being separate from the thumb turn, wherein the unlocked position of the lock position indicator is a retracted position in which a proximate portion of the lock position indicator is retracted within the drive assembly housing and the locked position is an extended position in which the proximate portion projects from the drive assembly housing.

12. The mortise lock motorization assembly of claim 10, wherein a communications interface of the drive assembly for coupling the interior end of the communications cable to the drive assembly is located on the drive assembly at a location that is sufficiently spaced from the drive shaft to overlie a portion of the door beyond a casing of the mortise lock when the casing of the mortise lock is installed in the door and the drive assembly is mounted to the interior side of the door with the drive.

13. The mortise lock motorization assembly of claim 10, wherein the drive assembly has a first end to form an upper end when the drive assembly is installed on the door, and a communications interface of the drive assembly for coupling the interior end of the communications cable to the drive assembly is located on the drive assembly with a portion of the communications interface that is nearest to the first end is located closer to the first end than a portion of the drive shaft that is nearest to the first end.

14. A door comprising the mortise lock motorization assembly of claim 10 installed to the door with the communications cable extending through the door bypassing a casing of a mortise lock installed to the door.

15. The mortise lock motorization assembly of claim 8, wherein the drive assembly mounted to the interior side of the door further comprises an auto lock button communicatively coupled to the motor to direct the motor to extend the deadbolt.

16. The mortise lock motorization assembly of claim 8, wherein the drive shaft includes a tailpiece to drivingly engage a bolt assembly of the lock by extending into a thumb turn slot in the bolt assembly.

17. A method of motorizing a mortise lock installed in a door, comprising:
- mounting a motorized drive assembly to an interior side of the door;
- attaching a drive shaft of the motorized drive assembly to a bolt assembly of the mortise lock in driving engagement with the bolt assembly to extend and retract a deadbolt of the bolt assembly and simultaneously lock and unlock an exterior handle of the mortise lock, wherein the exterior handle moveable to withdraw a latch of the mortise lock when the exterior handle is unlocked and the exterior handle is prevented from being moved to withdraw the latch when the exterior handle is locked, the motorized drive assembly including a motor coupled to the drive shaft to move the drive shaft;
- mounting a control panel to an exterior side of the door to receive an instruction from a user;
- coupling a first end of a communications cable to the control panel mounted to the exterior side of the door;

extending the communications cable through the door;

coupling a second end of the communications cable to the motorized drive assembly mounted to the interior side of the door to communicatively couple the control panel to the motor of the motorized drive assembly via the communications cable to direct an operation of the motor in response to the instruction from the user.

18. The method of claim 17, further comprising, following coupling a second end of the communications cable to the motorized drive assembly mounted to the interior side of the door to communicatively couple the control panel to the motor of the motorized drive assembly via the communications cable, providing the instruction via a sensor of the control panel by operating the sensor to detect an authorized user device or authorized key card in proximity to the sensor.

19. The method of claim 17, wherein extending the communications cable through the door includes extending the communications cable though a communications aperture in the door whereby the communications cable bypasses a casing of the mortise lock installed in the door.

20. The method of claim 19, further comprising, prior to extending the communications cable though the communications aperture, preparing the communications aperture by cutting a hole through the door.

21. The method of claim 17, wherein extending the communications cable through the door includes extending the communications cable though the door outside a perimeter of a casing of the mortise lock installed in the door.

22. The method of claim 21, wherein extending the communications cable through the door includes extending the communications cable though the door above the casing of the mortise lock installed in the door.

* * * * *